S. M. KINTNER.
ELECTRICAL MEASURING INSTRUMENT.
APPLICATION FILED OCT. 3, 1905.

999,800.

Patented Aug. 8, 1911.

WITNESSES:
C. L. Belcher
Otto S. Schairer.

INVENTOR
Samuel M. Kintner
BY
Wesley G. Carr
ATTORNEY

UNITED STATES PATENT OFFICE.

SAMUEL M. KINTNER, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

999,800.     Specification of Letters Patent.     Patented Aug. 8, 1911.

Application filed October 3, 1905. Serial No. 281,186.

*To all whom it may concern:*

Be it known that I, SAMUEL M. KINTNER, a citizen of the United States, and a resident of Pittsburg, in the county of Allegheny and State of Pennsylvania, have invented a new and useful Improvement in Electrical Measuring Instruments, of which the following is a specification.

My invention relates to electrical measuring instruments of the electrostatic type and it has for its object to provide means whereby the range of utility and the accuracy of operation of such instruments may be greatly increased over instruments heretofore constructed.

Electrostatic instruments usually comprise one or more stationary and movable vanes that are supported in electrostatic relation to each other and that are sometimes immersed in an insulating fluid contained within a grounded metallic receptacle in order to increase the efficiency and accuracy of operation and to enable simplification of the structure and reduction of its dimensions. It is in combination with such instruments that I propose to employ my invention which consists in providing one or more condensers which may be connected in series circuit with the stationary and movable vanes and in placing the condensers in the same insulating fluid and receptacle as contain the vanes of the instrument. Since the drops of potential over condensers which are connected in series circuit are inversely as the capacities of the condensers, the voltage existing between the relatively movable members may be adjusted by the inclusion in or the removal from the circuit of the condensers. If a plurality of differently divided scales are provided the instrument becomes adapted to the measurement of a greater range of voltages than would be the case if no condensers were employed. The instrument may in this manner be constructed to measure comparatively high and low voltages and intermediate voltages and its field of utility greatly enlarged.

Figure 1:
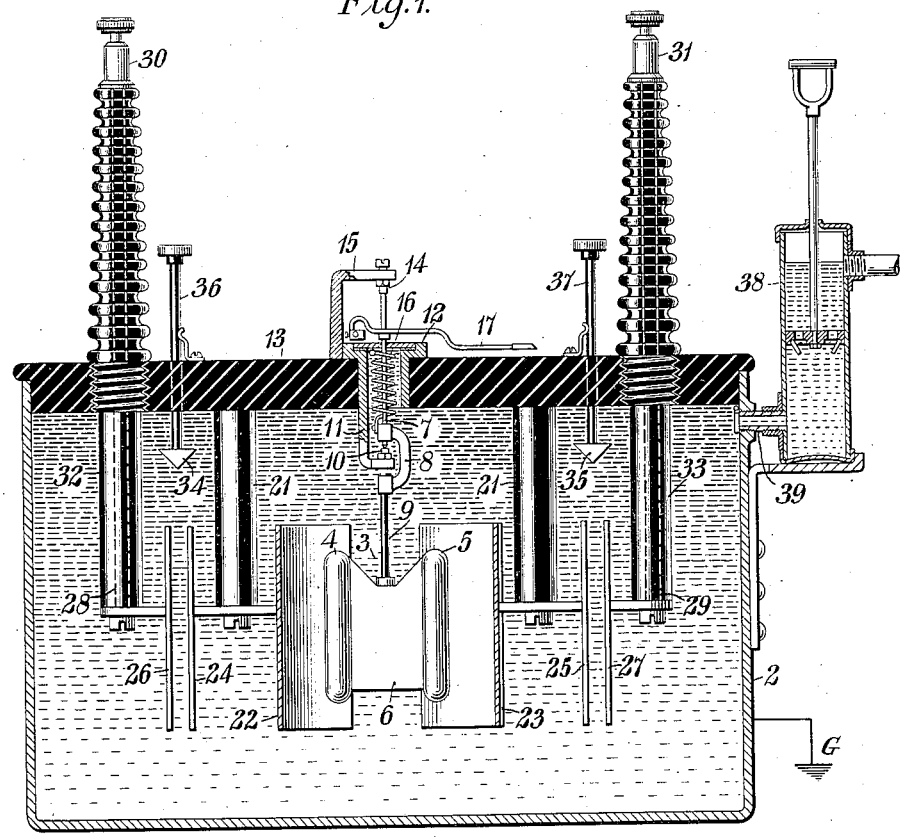
Figure 2:
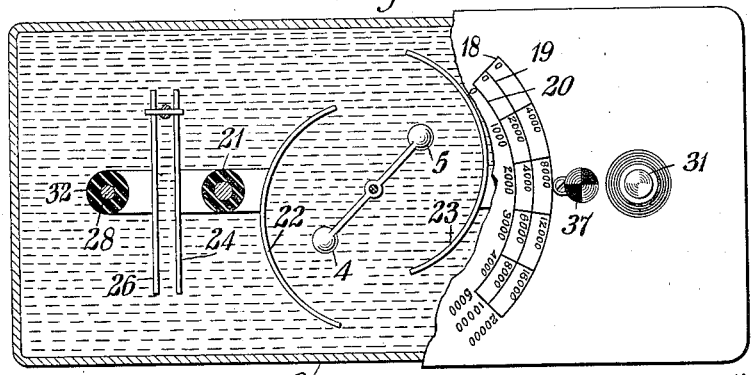

Figure 1 of the accompanying drawings is a sectional view of an instrument embodying my invention and Fig. 2 is a view partially in plan and partially in section, of the instrument shown in Fig. 1.

Movably supported in an insulating fluid that is contained within a metallic receptacle 2, having a connection to ground at G, is a conducting member 3 comprising a pair of hollow, cylindrical bodies 4 and 5 that are attached to opposite edges of a vane 6. The member 3 is suspended from a rod 7 by means of a clevis shaped piece 8, and an insulating rod 9. A bearing 10 is provided for the lower end of the rod 7 in an extension 11 of a bushing 12, that is suitably secured in a centrally located aperture in an insulating block 13 which forms the cover of the receptacle 2. A bearing 14 is also provided for the upper end of the rod 7 in the free end of a bracket 15, which is supported on the upper side of the cover 13 of the receptacle. Opposite ends of a spring 16 are connected respectively to the clevis shaped piece 8 and the bushing 12, rotation of the movable element 3 from its normal or zero position being opposed by the tension thereof. A pointer or index 17, that is carried by the rod 7 coöperates with a plurality of differently calibrated scales 18, 19 and 20 that are provided in any suitable manner upon the upper side of the insulating cover 13 to indicate by its angular deflections the forces measured by the instrument.

Mounted upon the under side of the cover 13 are insulating supports 21 for a pair of substantially cylindrical shaped vanes 22 and 23 that are arranged with their concave faces opposing each other and in proximity to the movable bodies 4 and 5. The vanes 4 and 5 are also so arranged with regard to the vanes 22 and 23 that as the member 3 is moved from its zero or normal position, the distances between the bodies 4 and 5 and the vanes 22 and 23 decrease at a proper rate in order that the scales 18, 19 and 20 may be substantially uniform; that is, in order that equal divisions thereof may represent equal forces. The insulators 21 also support condenser plates 24 and 25, the faces of which are arranged respectively opposite the faces of corresponding condenser plates 26 and 27 that are attached to the lower ends of conducting rods 28 and 29, having binding posts 30 and 31 at their upper ends, which serve as circuit terminals for the instrument. The rods 28 and 29 are inclosed and supported by tubular insulators 32 and 33 which are screw-threaded in the cover 13. The condenser plates 24 and 26 and the plates 25 and 27 may be electrically connected by means of conducting blocks 34 and 35, respectively, which are attached to the lower ends of insulating rods 36 and 37 which have sliding engagement in apertures in the cover 13.

If, as shown in the drawing, both of the conducting blocks 34 and 35 are raised out of engagement with the corresponding condenser plates, the instrument is adapted to the measurement of the highest voltages of which it is capable. The voltage existing between the vanes 22 and 23 will then be the difference between the total voltage of the external circuit and the sum of the drops of potential between the condenser plates 25 and 27 and between plates 24 and 26, the drops of potential between the corresponding condenser plates and between the vanes 22 and 23 being, according to well understood principles, inversely proportional to the electro-static capacities of these parts. The voltages corresponding to the actuating forces will, in the case illustrated, be indicated upon the scale 18.

If it is desired to measure lower voltages than can be accurately indicated on the scale 18, one or the other of the conducting blocks 35 and 36 should be lowered so as to short circuit one of the condensers and the voltages will then be indicated by correspondingly larger deflections upon the scale 19. In this case, the voltage which exists between the vanes 22 and 23 is equal to the difference between the total voltage of the circuit and the drop potential over the condenser which remains in circuit. If it is desired to measure still lower voltages, both of the conducting blocks should be lowered so as to render both condensers ineffective so that the total voltage of the external circuit may be impressed upon the vanes 22 and 23. The voltages will then be indicated upon the scale 20.

Since the dielectric strengths of insulating fluids in general are increased when compressed it may often be found desirable to provide a suitable means whereby compression may be effected, such, for instance, as a pump 38 that is connected by means of a pipe or tube 39 with the receptacle 2.

It should be noted particularly that owing to the employment of the auxiliary condensers the distances between the stationary vanes and the movable body may be diminished and the forms of the scales thereby much improved. An important advantage which pertains to the placing of the auxiliary condenser plates in the same dielectric as that in which stationary and movable elements of the instruments are immersed is that no errors may then be introduced in the measurements owing to changes in frequency and wave form. The grounded metal receptacle also serves to prevent trouble which might arise due to static induction from the condensers to adjacent objects since it is capable of screening them from external effects and keeping them in constant relation at all times.

I claim as my invention:

1. An electrical measuring instrument comprising stationary and movable members arranged in electrostatic relation, one or more condensers connected in series circuit therewith, a body of insulating liquid in which said parts are immersed, and means for maintaining said liquid under compression.

2. An electrical measuring instrument comprising stationary and movable members arranged in electrostatic relation, one or more condensers connected in series circuit therewith, means for short-circuiting the condenser or condensers, an insulating liquid, a containing vessel therefor and means for maintaining said liquid under pressure.

3. An instrument comprising stationary vanes, a movable member supported in electrostatic relation thereto, one or more condensers having terminals connected to the respective stationary vanes and to circuit terminals of the instrument, means for short-circuiting the condenser or condensers, an insulating liquid, a containing vessel therefor, and means for maintaining said liquid under pressure.

4. An instrument comprising stationary vanes, a movable member supported in electrostatic relation thereto, one or more condensers having terminals connected to the respective stationary vanes and to circuit terminals of the instrument, bridging devices and means for moving them into and out of engagement with the condenser electrodes, an insulating liquid, a containing vessel therefor, and means for maintaining said liquid under pressure.

In testimony whereof, I have hereunto subscribed my name this 29th day of September, 1905.

SAMUEL M. KINTNER.

Witnesses:
A. M. SKINNER,
BIRNEY HINES.